United States Patent [19]

Deckler

[11] Patent Number: 4,520,875
[45] Date of Patent: Jun. 4, 1985

[54] MARKER FOR TILLING IMPLEMENTS
[75] Inventor: Harry C. Deckler, South Bend, Ind.
[73] Assignee: White Farm Equipment Company, Oak Brook, Ill.
[21] Appl. No.: 546,279
[22] Filed: Oct. 28, 1983
[51] Int. Cl.³ .............................................. A01B 69/02
[52] U.S. Cl. .................... 172/126; 172/572; 172/711
[58] Field of Search ............... 172/126, 127, 128, 129, 172/130, 131, 132, 572, 573, 705, 711

[56] References Cited

U.S. PATENT DOCUMENTS

| | | | |
|---|---|---|---|
| 2,178,124 | 10/1939 | Robinson | 172/128 |
| 2,331,730 | 10/1943 | Rusco | 172/127 |
| 2,613,586 | 10/1952 | Boenig | 172/126 |
| 2,962,103 | 11/1960 | Hansen | 172/126 |
| 4,196,779 | 4/1980 | Steilen | 172/126 |
| 4,452,319 | 6/1984 | Miguet | 172/573 |

FOREIGN PATENT DOCUMENTS

| | | | |
|---|---|---|---|
| 9610 | 9/1927 | Australia | 172/126 |
| 1392186 | 4/1975 | United Kingdom | 172/126 |

Primary Examiner—Richard J. Johnson
Attorney, Agent, or Firm—Lockwood, Alex, FitzGibbon & Cummings

[57] ABSTRACT

A no-till marker for multi-row planters characterized by a soil-engaging disc yieldably supported on the outer or distal end of a marker support arm and oriented so that the concave face of the disc is turned generally toward the direction of implement travel. The disc is rotatable on its principal axis.

1 Claim, 4 Drawing Figures

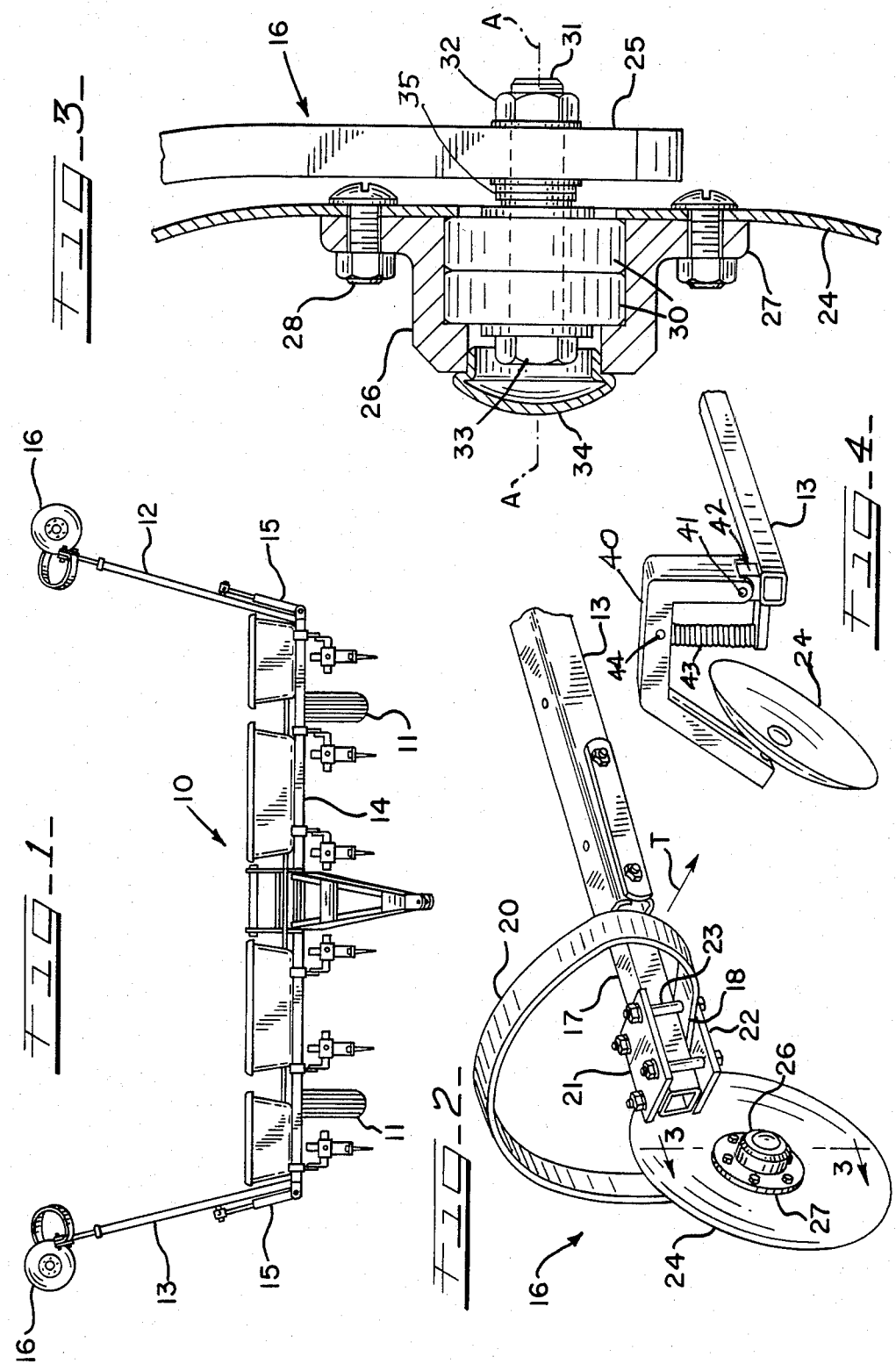

MARKER FOR TILLING IMPLEMENTS

This invention relates generally to innovations and improvements in markers for multi-row planters and similar soil tilling implements. The marker improvements and innovations provided by the present invention are especially useful in connection with no-till and medium till planting and tilling operations.

Markers for multi-row planters and other soil tilling implements are well-known and are described, for example, in U.S. Pat. No. 2,956,629 dated Oct. 18, 1960 and my prior U.S. Pat. No. 4,067,394 dated Jan. 10, 1978. In general, such markers comprise a marker support arm mounted on each opposite end of the planter or other tilling implement with some form of soil marking or disturbing device, such as a disc or spade, carried on the distal end of the marker support arm. As is well-known, one of the two markers will be lowered and operational when the implement is travelling in one directin while the other marker will be lowered and operational when the implement is travelling in the opposite direction. The marker support arms will be raised and non-operational when the implement is in transit.

So-called no-till and medium till planting and other tilling operations have become increasingly popular due to the increased recognition of the importance of soil conservation. Accordingly, the familiar well-prepared seed beds for crops are becoming less and less popular and farmers have increasingly adopted no-till and medium till practices. However, known markers that served well to leave well-defined and visible marks in well-tilled and prepared seed beds have been found quite inadequate in no-till and medium till operations, especially when the soil surface is covered with sod or stubble, as is often the case.

In view of the foregoing, it will be seen that the primary object of the present invention is the provision of improved marker means for multi-row planters and other tilling implements used in no-till and medium till planting and tilling operations, which will leave well-identified and highly visible marks in the surface of the soil or ground, even when covered with sod or stubble.

An important object of the invention is the provision of a marker assembly or attachment for mounting on the outer or distal end of each multi-row planter marker support arm and providing a disc which is yieldably supported with a concave face turned generally toward the direction of travel of the implement and preferably tilted downward toward the direction of travel.

In its preferred form, the improved no-till marker attachment or assembly of the present invention comprises a generally C-shaped leaf spring arm with its proximal end clamped to the distal end of an implement marker support arm and with the soil engaging disc rotatably supported on the distal end of the spring arm and oriented so that the concave face of the disc is turned generally toward the direction of travel of the planter or other no-till implement.

For a more complete understanding of the nature and scope of the invention, reference may now be had to the following detailed description of a preferred embodiment thereof taken in connection with the accompanying drawings wherein:

FIG. 1 is a front elevation of a multi-row planter of one known type adapted to be pulled behind a tractor and having a row marker mounted on each opposite end of the planter frame;

FIG. 2 is a fragmentary perspective view showing the marker attachment or assembly mounted on the outer end of one of the marker arms of the implement shown in FIG. 1;

FIG. 3 is a sectional view on enlarged scale taken on line 3—3 of FIG. 2; and

FIG. 4 is a fragmentary perspective view of a marker attachment constituting another embodiment of the invention.

Referring to FIG. 1, a multi-row planter of known conventional type is indicated generally at 10 being of the so-called pull-type and mounted on ground support wheels 11-11 which are arranged to be raised and lowered in synchronism in known manner. While the planter 10 is of the pull-type, it will be understood that it could also be of the tool bar type mounted in known manner on the three-point hitch of a farm tractor.

Whether of the pull-type or tool bar type, the proximal ends of a pair of left and right hand row marker arms 12 and 13 of known type are pivotally mounted on opposite ends of the frame 14 of the planter 10 and actuatable between their raised and lowered positions by hydraulic actuating cylinders 15-15. For a detailed description of the mounting and operation of the marker arms 12 and 13, reference may be had to my U.S. Pat. No. 4,067,394 dated Jan. 10, 1978 and U.S. Pat No. 4,285,268 dated Aug. 25, 1981, the disclosures of which are incorporated by reference herein.

Corresponding marker attachments or assemblies 16-16 embodying the present invention are mounted on the distal ends of the marker support arms 12 and 13. One of these marker assemblies or attachments 16 will now be described in detail in connection with FIGS. 2 and 3.

The distal end of the marker support arm 13 includes an extension 17 to which the proximal end 18 of a generally C-shaped leaf spring 20 is attached or clamped by means of a pair of clamp plates 21 and 22 drawn together on opposite sides of the extension 17 by means of four corner bolts 23-23. It will be noted that the proximal end 18 has an aperture therein through which one of the bolts 23 passes. This arrangement permits the C-spring 20 to be adjustably turned to one side or the other when the clamping means is suitably loosened.

A concave, soil-engaging marker disc 24 is rotatably mounted on the distal end 25 of the C-spring 20 by means of a hub attaching assembly which includes a hub 26 which has a circular flange 27 secured to the center of the disc 24 by means of a plurality of bolt-nut fasteners 28-28. The hub 26 provides a housing for a pair of ball bearings 30-30 through which extends a bolt 31 on which the inner races of the bearings are journaled.

The threaded end of the bolt 31 projects through an aperture in the distal end 25 of the C-spring 20 and is provided with a hex nut 32. The head end of the bolt 31 projects through the left-hand bearing 30 the exposed side of which is engaged by the bolt head 33. A plurality of spacer washers 35 are inserted between the exposed side of the right-hand bearing 30 and the C-spring 20 so as to provide clearance for the fasteners 28.

A hub cap 34 is removably pressed into the open end of the hub 26 and prevents dirt and debris from entering the assembly and fouling the bearings 30.

The hub mounting assembly permits the disc 24 to rotate freely on its principal axis which is indicated in FIG. 3 by the broken line A-A.

The direction of travel of the planter 10, including the marker support arms 12 and 13, is indicated by this arrow T in FIG. 2. The disc 24 is oriented so that its concave face is turned generally in the direction of travel of the implement as indicated by the arrow T. Preferably, The C-spring arm 20 is so adjusted that the axis A of the disc 24 falls between 15° to 30° to either the left or right side of the arrow T. Further, the concave base of the disc is preferably tilted downward in the direction of travel so that the axis A is tilted downwardly and forwardly approximately 5° to 15° with respect to the arrow T.

The foregoing yieldable and rotatable mounting and orientation of the disc 24 causes it to disturb a wide but shallow strip of soil and/or vegetation as the implement 10 is pulled across a field so as to leave a well-defined and easily observed elongated mark for the operator to follow on his next pass.

The yieldable, spring-mounting of the disc blade 24 allows the marker assembly or attachment 16 to be self-limiting as to load and depth. Thus, as the disc load increases, the angle relationship to the soil is reduced due to yielding of the C-spring arm 20 and the depth of penetration by the blade is correspondingly reduced, thus preventing overloads on the supporting structure and providing protection from rocks and other encountered obstructions. The yieldable spring-mounting of the disc 24 is such that as load is applied when the disc blade is performing its marking function, the soil engaging or contacting portion of the disc (which changes as the disc rotates) can move rearwardly and upwardlly as around a theoretical pivot point located above and ahead of the soil contacting portion of the disc.

It will be appreciated that the C-shaped leaf spring support arm 20 can be replaced with other mounting and support arrangements. For example, in the embodiment shown in FIG. 4 the arm 20 is replaced by a rigid non-yielding arm 40 with its proximal end pivotally attached to the marker support arm 13 by a pin 41 extending through an upstanding lug 42 thereon. A tension spring 43 has one end anchored to a pin 44 carried by the horizontal portion of the arm 40 and the other end anchored to a support bracket 45 extending from the marker support arm 13. The combination of the rigid arm 40 and the tension spring 43 provides a yieldable support for the disc 24 which is comparable to that provided by the C-shaped leaf spring 20 (FIG. 2). However, the C-shaped leaf spring mounting arm 20 shown has proved to be highly satisfactory and has the advantages of being economical and providing trouble-free, long-life operation.

What is claimed as new is:

1. Soil marking means for soil tilling implements including planters, comprising, a marker support arm and a soil marker assembly, said soil marker assembly comprising, a soil-engaging disc, yieldable support means for said disc in the form of a generally C-shaped leaf spring having a proximal end and a distal end, means for attaching said proximal end of said yieldable support means to the distal end of said marker support arm, and means for rotatably attaching the center of said disc to the distal end of said yieldable support means and allowing said disc to rotate on its principal axis, said disc being oriented with respect to said marker support arm and said yieldable support means so that a face of said disc is turned generally toward the direction of travel of said marker support arm and said soil and tilling implement, the principal axis of said disc falls between about 15° to 30° to either side of said direction of travel and is tilted downwardly and forwardly at an angle between about 5° to 15°.

* * * * *